(12) United States Patent
Liu et al.

(10) Patent No.: US 11,491,828 B2
(45) Date of Patent: Nov. 8, 2022

(54) TIRE NOISE REDUCTION DEVICE

(71) Applicant: CHENG SHIN RUBBER IND. CO., LTD., Chang-Hwa (TW)

(72) Inventors: Chi Min Liu, Chang-Hwa (TW); Yuan Hsiang Lo, Chang-Hwa (TW); Teng Kai Cheng, Chang-Hwa (TW); Sheng Jie Lin, Chang-Hwa (TW)

(73) Assignee: Cheng Shin Rubber Industrial Co., Ltd., Tasuen (TW)

( * ) Notice: Subject to any disclaimer, the term of this patent is extended or adjusted under 35 U.S.C. 154(b) by 340 days.

(21) Appl. No.: 16/515,178

(22) Filed: Jul. 18, 2019

(65) Prior Publication Data

US 2020/0023692 A1 Jan. 23, 2020

(30) Foreign Application Priority Data

Jul. 20, 2018 (TW) ................................. 107125252

(51) Int. Cl.
 *B60C 19/00* (2006.01)
(52) U.S. Cl.
 CPC .................................. *B60C 19/002* (2013.01)
(58) Field of Classification Search
 CPC ...... B60C 19/002; B60C 19/00; B60C 17/065
 See application file for complete search history.

(56) References Cited

U.S. PATENT DOCUMENTS

| 2019/0202247 | A1* | 7/2019 | Hoshiba | .................. | B60C 5/00 |
| 2020/0331306 | A1* | 10/2020 | Goossens | ............ | B60B 17/0024 |

FOREIGN PATENT DOCUMENTS

| DE | 102016222345 | A1 | * | 5/2018 | ........... | B60C 19/002 |
| JP | 2004082947 | A | * | 3/2004 | ........... | B60C 19/002 |
| JP | 2004168212 | A | * | 6/2004 | ........... | B60C 19/002 |
| KR | 20090010938 | A | * | 1/2009 | ........... | B60C 19/002 |
| WO | WO-2017001997 | A1 | * | 1/2017 | ........... | B60C 19/002 |

OTHER PUBLICATIONS

JP 2004168212 Machine Translation; Hirano, Masaaki (Year: 2004).*
KR 20090010938 Machine Translation; Kim, Gi Jeon (Year: 2009).*
DE 102016222345 Machine Translation; Dirk, John (Year: 2018).*
JP 2004-082947 Machine Translation; Miyagawa, Shinji (Year: 2004).*

* cited by examiner

*Primary Examiner* — Robert C Dye
*Assistant Examiner* — Nicholas J Weiler
(74) *Attorney, Agent, or Firm* — Rosenberg, Klein & Lee (57) ABSTRACT

A tire noise reduction device is applicable for a tire, and the tire including an tread, an inner surface, and a cavity defined inside the inner surface and configured to accommodate the tire cavity noise absorber. The tire cavity noise absorber contains at least one sound absorbing material, each of the at least one sound absorbing material includes an air chamber defined therein, a contacting face, and an extending face opposite to the contacting face. The contacting face is adhered on a portion of the inner surface corresponding to the tread by using adhesive material, and each sound absorbing material further includes a channel passing through the extending face, communicating with the air chamber, and facing a central direction of the tire.

9 Claims, 10 Drawing Sheets

TIRE NOISE REDUCTION DEVICE

FIELD OF THE INVENTION

The present invention relates to a tire noise reduction device which reduces noises from the cavity when the tire runs on the road.

BACKGROUND OF THE INVENTION

A conventional tire cavity noise absorber is disclosed in U.S. Pat. No. 7,874,329 B2, disclosed is a low noise pneumatic tire in which a plurality of noise absorbing members of a porous material are attached to the tire inner peripheral surface with intervals in the tire circumferential direction. The number of the noise absorbing members is from 5 to 50. The total length obtained by integrating the lengths of the noise absorbing members in the tire circumferential direction is not less than 75% of the tire maximum inner peripheral length. The distance between each adjacent two of the noise absorbing members is equal to or more than the maximum thickness of the noise absorbing members at the end portions thereof in the tire circumferential direction, while being not more than 15% of the tire maximum inner peripheral length.

Another conventional tire cavity noise absorber is disclosed in U.S. Pat. No. 7,182,114 B2 relates to a tire noise reducing system comprising a pneumatic tire, a wheel rim on which the pneumatic tire is mounted, and a noise damper disposed in a cavity surrounded by an inner surface of the rim and an inner surface of the tire mounted thereon, wherein the noise damper has a volume V2 which is from 0.4 to 20% of the volume V1 of the cavity, and the noise damper is made of a porous material having a hardness of from 10 to 80 N, a tensile strength of not less than 70 kPa and a specific gravity of from 0.014 to 0.026.

Another conventional tire cavity noise absorber is disclosed in EP 2,397,314 B1, is directed to a method of making a tire having a foam noise damper, comprising the steps of: disposing a silicone rubber foam noise damper onto an exposed virgin surface of a green innerliner of a green tire; disposing a barrier layer over the silicone rubber foam noise damper, the silicone rubber foam noise damper being located between the virgin surface of the green tire innerliner and the barrier layer; curing the green tire; and removing the barrier layer to reveal the silicone rubber foam noise damper.

At least one sound absorbing material is made of flexible material is U.S. Pat. No. 6,343,843 disclosed a pneumatic tire, a wheel rim, and an assembly of a pneumatic tire and a wheel rim, which are provided with lawn-like materials for damping air resonance of the tire cavity are disclosed. An assembly of a pneumatic tire and a wheel rim where a foaming agent is injected into the tire cavity is also disclosed.

At least one sound absorbing material is made of fiber material is U.S. Pat. No. 9,045,006 disclosed a tire including a crown, sidewalls extending the crown on each side, these sidewalls being connected to beads intended to be in contact with a mounting rim on which the tire is mounted, this tire having an internal wall delimiting, with the mounting rim, an internal cavity to allow the tire to be inflated. This tire includes, over at least part of its internal wall delimiting the internal cavity, a plurality of protrusions of elongate shape foil ring a dense coating, this tire being characterized in that these protrusions of elongate shape include a plurality of supporting fibers and a plurality of branching fibers, the branching fibers being attached to the supporting fibers, each supporting fiber having two ends, of which at least one is attached to the internal wall of the tire.

In addition, at least one porous sound absorbing strip or flap is U.S. Pat. No. 6,533,009 disclosed a tire noise damper to be disposed in an annular tire cavity foil red between a wheel rim and a pneumatic tire mounted thereon. The damper comprises an annular band-like body which is made of an elastomeric material and provided with at least one generally U-shaped cut oriented in a circumferential direction. The cutout formed by the at least one U-shaped cut forms a flap risen by a centrifugal force during running, and the remainder forms a base band to be put around a bottom of the wheel rim in an elongated condition. In order to reduce resonance of the air in the tire cavity in not only the fundamental mode but also the higher harmonic modes, the flap may have a relatively long length such that, when risen, a radially outer end portion thereof comes into contact with the radially inside of a tread portion of the tire. Further, the flap may be made of nonwoven fabric at least partially.

The present invention has arisen to mitigate and/or obviate the afore-described disadvantages.

SUMMARY OF THE INVENTION

The primary object of the present invention is to provide a tire noise reduction device which reduces noises from the cavity when the tire runs on the road.

To obtain above-mentioned objects, a tire noise reduction device provided by the present invention is applicable for a tire, and the tire includes an tread formed on an outer wall thereof, an inner surface formed on an inter wall of the tire, and a tire cavity defined inside the inner surface and configured to accommodate the noise reduction structure.

The noise reduction structure contains at least one sound absorbing material, each of the at least one sound absorbing material includes an air chamber defined therein, a contacting face, and an extending face opposite to the contacting face. The contacting face is adhered on a portion of the inner surface corresponding to the tread, and each sound absorbing material further includes a channel passing through the extending face, communicating with the air chamber, and facing a central direction of the tire, wherein the at least one sound absorbing material occupies 21% to 90% of a volume of the tire cavity.

DETAILED DESCRIPTION OF THE PREFERRED EMBODIMENTS

Figure 1:
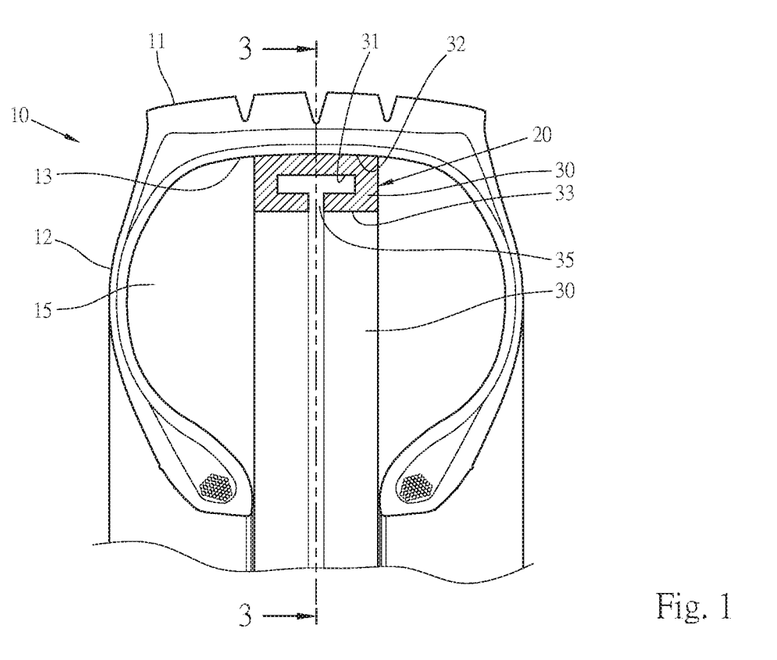
FIG. 1 is a cross sectional view showing the assembly of a tire noise reduction device according to a first embodiment of the present invention.
Figure 2:
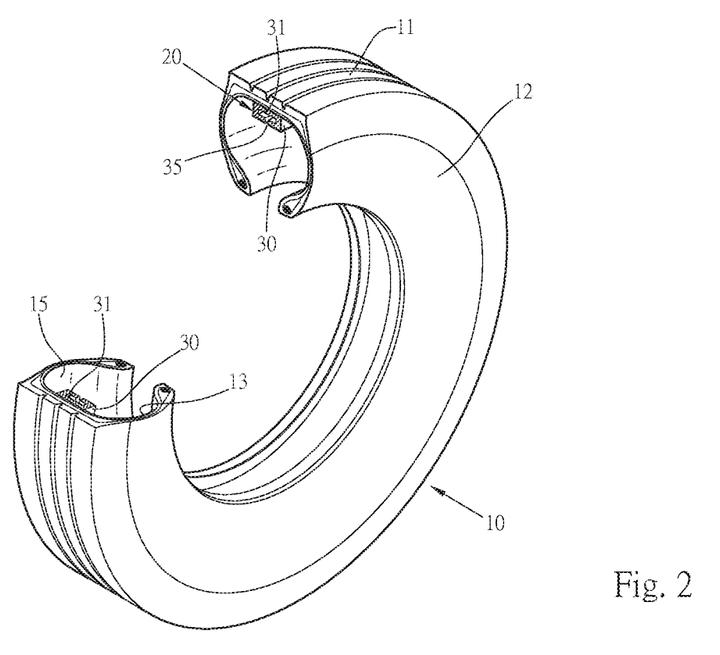
FIG. 2 is a cross-sectional perspective view showing the assembly of a part of the tire noise reduction device according to the first embodiment of the present invention.

With reference to FIGS. 1 and 2, a tire noise reduction device according to a first embodiment of the present invention is applicable for a tire 10, and the tire 10 includes an tread 11 formed on an outer wall thereof, two sidewall 12 extending from two sides of the tread 11 respectively, an inner surface 13 formed on an internal wall of the tire 10, and a tire cavity 15 defined inside the inner surface 13 and configured to accommodate the noise reduction structure 20.

The tire noise reduction structure 20 comprises a sound absorbing material 30 which occupies 21% to 90% of a volume of the tire cavity 15, a thickness of the sound absorbing material 30 is 4 mm to 230 mm, and a width of the sound absorbing material 30 is 3% to 95% of a width of the tread 11. The sound absorbing material 30 includes an air chamber 31 defined therein and configured to accommodate solid material, inert gas, or semi-viscous liquid, wherein the solid material is made of carbon fiber or graphite fiber. In addition, the sound absorbing material 30 includes a channel 35 defined between the air chamber 31 and the sound absorbing material 30 and is narrow.

Figure 8:
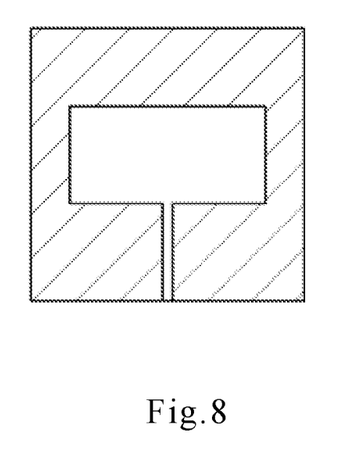
FIG. 8 is a cross sectional view showing the sound absorbing material which width of channel/width of the air chamber=5%.
Figure 9:
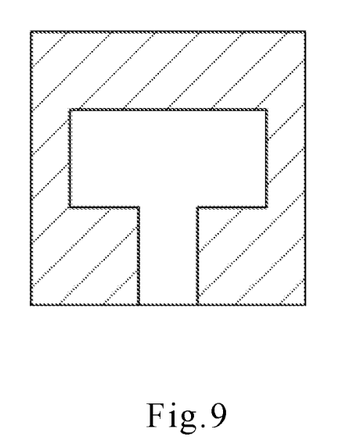
FIG. 9 is a cross sectional view showing the sound absorbing material which width of channel/width of the air chamber=30%.
Figure 10:
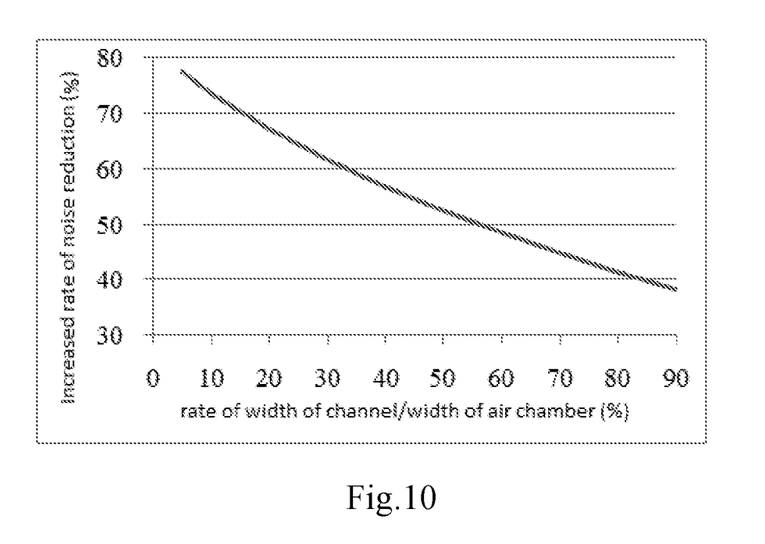
FIG. 10 is a list showing the rate of the width of the channel and the width of the air chamber.

Thereby, the sound absorbing material 30 facilitates noise absorption by ways of the air chamber 31 and the channel 35. A noise reduction rate is quantized by measuring the volume of the tire cavity 15 and a size of the air chamber 31, such as a rate between the channel 35 and the air chamber 31, i.e., a rate of a width of the channel 35/a width of the air chamber 31, a rate of a length of the channel 35/a length of the air chamber 31, and a rate of a depth of the channel 35/a depth of the air chamber 31, wherein an occupy range of the sound absorbing material 30 in the volume of the tire cavity 15 is fixed, and an occupy range of the sound absorbing material 30 in a volume of the air chamber 31 (length× width×depth) is fixed. For example, with reference to FIGS. 8 to 9, a rate of the width of the channel 35/the width of the air chamber 31 is changed within a specific range as follows:

| Rate (%) | 5 | 10 | 20 | 30 | 40 | 50 | 60 | 70 | 80 | 90 |
|---|---|---|---|---|---|---|---|---|---|---|
| noise reduction rate compared with no air chamber | 77.5% | 73.5% | 67% | 61.5% | 56.7% | 52.4% | 48.5% | 44.8% | 41.4% | 38.1% | with reference to FIG. 10, when the width of the air chamber is fixed and a rate of the width of the channel/the width of the air chamber increases, the noise reduction rate compared with no air chamber decreases gradually. When the rate of the width of the channel/the width of the air chamber increases is within 60% to 90%, the noise reduction rate is decreased to less than 50%. Accordingly, the rate of the width of the channel/the width of the air chamber increases is within 5% to 50% (the noise reduction rate is more than 50%). Preferably, the rate of the width of the channel/the width of the air chamber is within 5% to 10% (the noise reduction rate is more than 70%).

Figure 11:
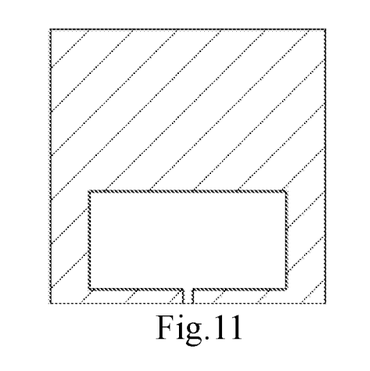
FIG. 11 is a cross sectional view showing the sound absorbing material which length of the channel/the length of the air chamber=10%
Figure 12:
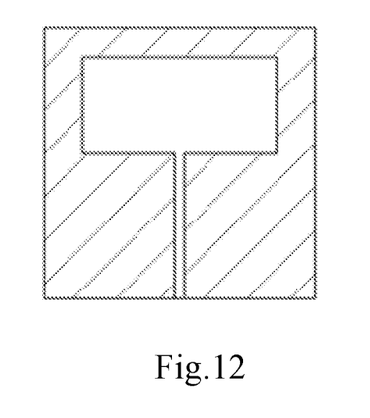
FIG. 12 is a cross sectional view showing the sound absorbing material which length of the channel/the length of the air chamber=110%

With reference to FIGS. 11 and 12, when the rate of the width of the channel/the width of the air chamber is 5%, testing conditions of the length of the channel are listed as follows:

1. The occupy range of the sound absorbing material in the volume of the tire cavity is fixed, and the occupy range of the sound absorbing material in the volume of the air chamber (length×width×depth) is fixed.

2. The rate of the width of the channel/the width of the air chamber is 5%, wherein the channel is hollow and extends inside a circumference of the tire.

3. We discuss a change of a rate of the length of the channel/the length of the air chamber as follows:

| Rate % | 10 | 20 | 30 | 40 | 50 | 60 | 70 | 80 | 90 | 100 | 110 | 120 |
|---|---|---|---|---|---|---|---|---|---|---|---|---|
| noise compared with no air chamber | 52.4% | 64.1% | 69% | 71.7% | 73.5% | 74.7% | 75.7% | 76.4% | 77% | 77.5% | 77.9% | 78.2% |
| difference % | | 11.7 | 4.9 | 2.7 | 1.8 | 1.2 | 1 | 0.7 | 0.6 | 0.5 | 0.4 | 0.3 |

Figure 13:
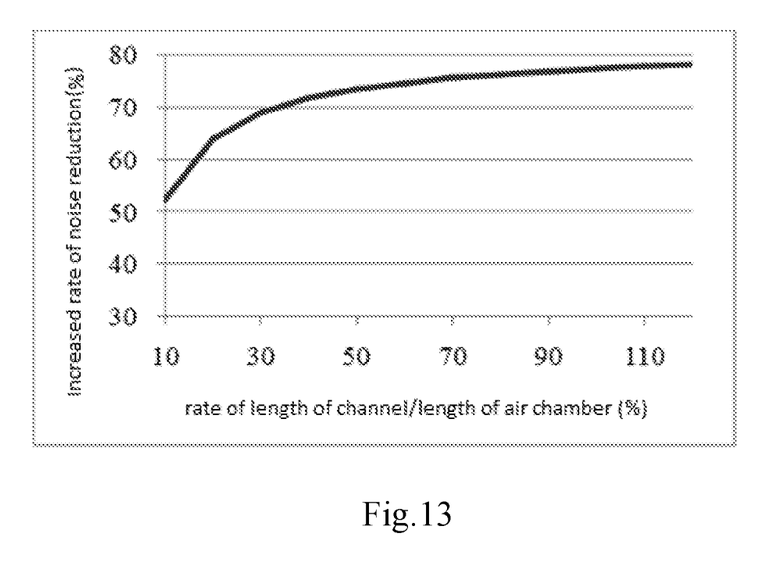
FIG. 13 is a list showing the rate of the width of the channel and the width of the air chamber.

With reference to FIG. 13, the rate of the width of the channel/the width of the air chamber is 5%, the occupy range of the sound absorbing material in the volume of the cavity is fixed, and the occupy range of the sound absorbing material in the volume of the air chamber is fixed. When the rate of the length of the channel/the length of the air chamber is more than 120%, a thickness of the sound absorbing material exceeds, so a maximum rate of the length of the channel/the length of the air chamber is 120%.

Accordingly, when the rate of the length of the channel/the length of the air chamber is increased, the noise reduction rate increases. When the rate of the length of the channel/the length of the air chamber is more than 40%, the noise reduction rate is over 70%, so the rate of the length of the channel/the length of the air chamber is within 40% to 100% (the noise reduction rate is over 70%). Preferably, the rate of the length of the channel/the length of the air chamber is within 80% to 110% (the noise reduction rate is over 76%), wherein an increase value of the rate of the length of the channel/the length of the air chamber is 10%, the noise reduction rate is increased to 0.3% only, thus strength of the sound absorbing material decreases (since a thickness of a top of the air chamber is too thin) Therefore, when the length of the channel is close to the length of the air chamber, a preferred rate of the length of the channel/the length of the air chamber obtains.

Figure 14:
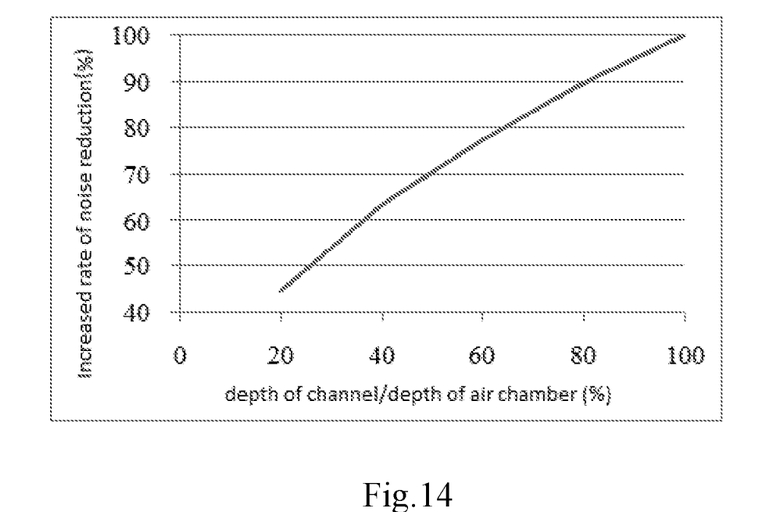
FIG. 14 is a list showing the rate of the depth of the channel/the depth of the air chamber.

Further, testing conditions of the depth of the channel are listed as follows:

1. The occupy range of the sound absorbing material in the volume of the tire cavity is fixed, and the occupy range of the sound absorbing material in the volume of the air chamber (length×width×depth) is fixed.

2. The rate of the width of the channel/the width of the air chamber is 5%, wherein the rate of the length of the channel/the length of the air chamber is 100%.

3. The width and the depth of the channel are fixed, and the sound absorbing material surrounds around the channel and the air chamber evenly.

4. A total depth of the channel/the depth of the air chamber (i.e., a circumferential length of the sound absorbing material);

5. We discuss a change of a rate of the depth of the channel/the depth of the air chamber as follows.

6. The noise reduction rates are listed in following list.

| | size % | | | | |
|---|---|---|---|---|---|
| | 20 | 40 | 60 | 80 | 100 |
| noise reduction rate % | 44.73 | 63.24 | 77.41 | 89.44 | 100 |

With reference to FIG. 14, accordingly, when the sound absorbing material is adhered around the cavity (i.e., the circumferential length of the sound absorbing material is close to the total depth of the channel), a best noise reduction is achieved. When the sound absorbing material is adhered on multiple sections of the cavity at different angles, a rate of the total depth of the channel/the depth of the air chamber (i.e., the circumferential length of the sound absorbing material) is more than 40%.

Figure 3:
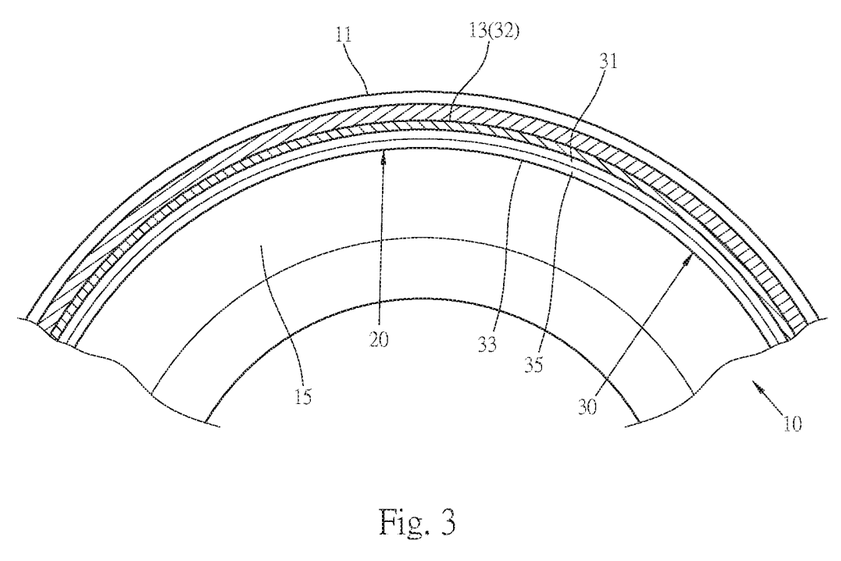
FIG. 3 is a cross sectional view showing the assembly of a part of the tire noise reduction device according to the first embodiment of the present invention.

Referring to FIGS. 1-3, the sound absorbing material 30 includes a contacting face 32 and an extending face 33 opposite to the contacting face 32, wherein the contacting face 32 is adhered on a portion of the inner surface 13 corresponding to the tread 11 by using adhesive material, such as adhesive or double-sided tape (a composite of chloroprene rubber organic solvent or acrylic), and an allowable environment temperature is −40° C. to 190° C. The sound absorbing material 30 includes the channel 35 passing through the extending face 33, communicating with the air chamber 31, and facing a central direction of the tire 10.

Thereby, when the tire runs on a road, noises enter into the air chamber 31 from the tire cavity 15 via the channel 35 so as to be absorbed by the sound absorbing material 30, thus reducing the noises.

Figure 4:
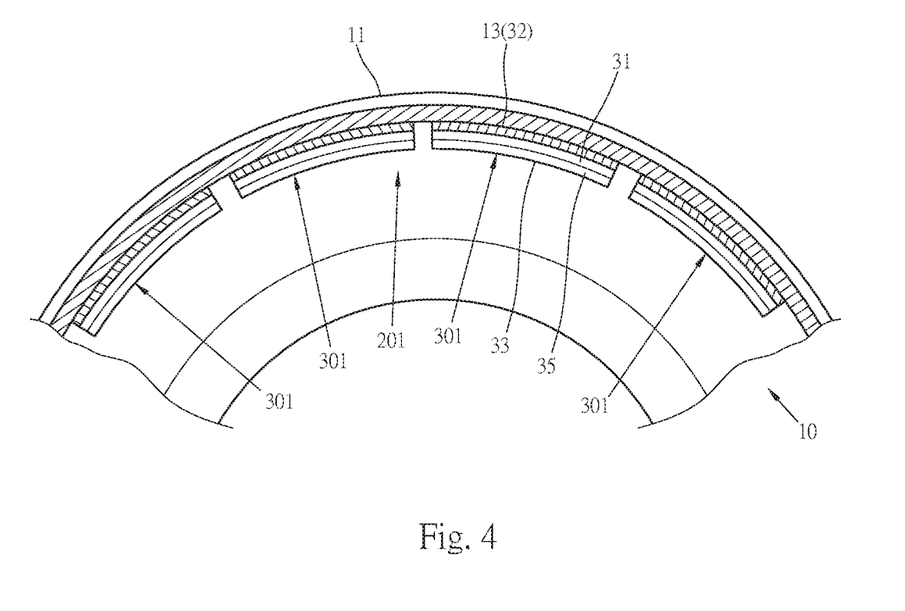
FIG. 4 is a cross sectional view showing the assembly of a part of a tire noise reduction device according to a second embodiment of the present invention.

In a second embodiment, the noise reduction structure 201 comprises multiple sound absorbing materials 301 including multiple contacting faces 32 respectively and separately adhered on a portion of the inner surface 13 corresponding to the tread 11 by using adhesive material, wherein a spaced angle between any two adjacent sound absorbing materials 301 is 10 degrees to 30 degrees so as to reduce a weight and a cost of the noise reduction structure 201.

Figure 5:
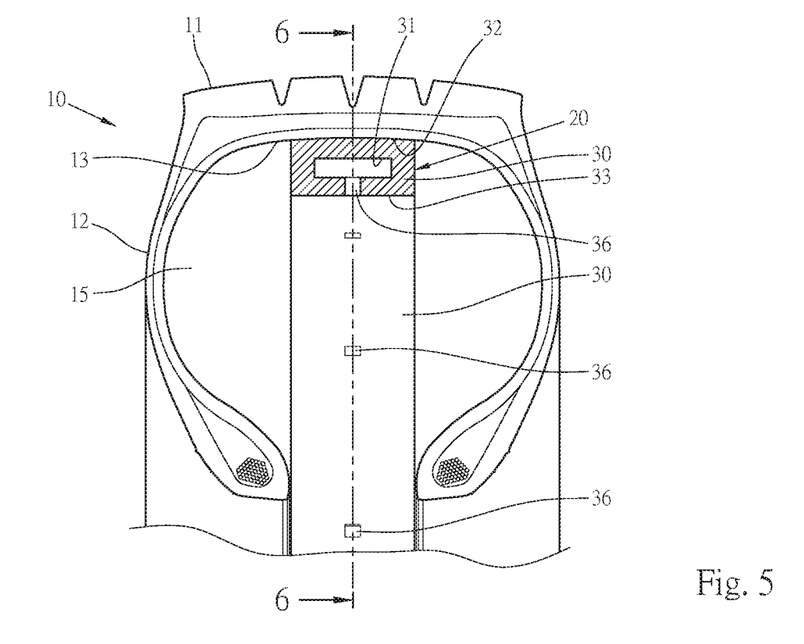
FIG. 5 is a cross sectional view showing the assembly of a tire noise reduction device according to a third embodiment of the present invention.
Figure 6:
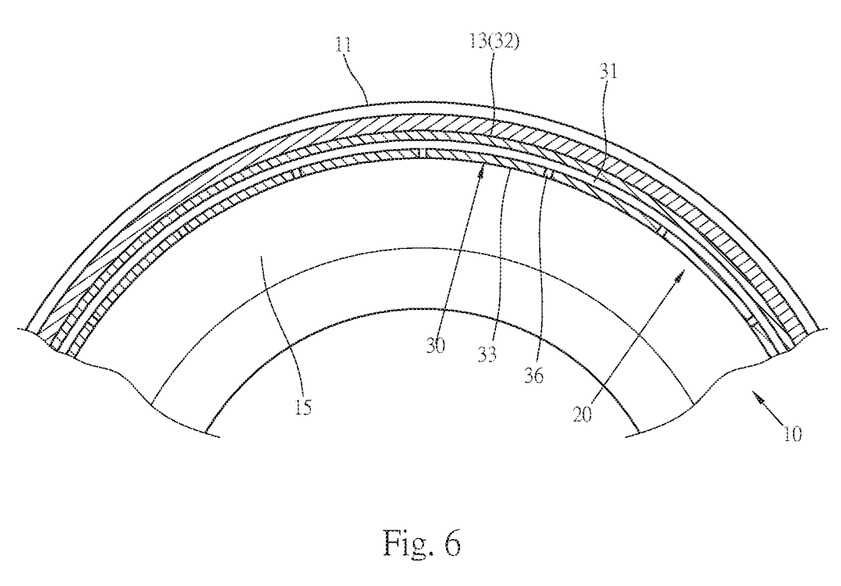
FIG. 6 is a cross sectional view showing the assembly of a part of the tire noise reduction device according to the third embodiment of the present invention.

As shown in FIGS. 5 and 6, in a third embodiment, a noise reduction structure 20 comprises a sound absorbing material 30 which occupies 21% to 90% of a volume of the tire cavity 15, a thickness of the sound absorbing material 30 is 4 mm to 230 mm, and a width of the sound absorbing material 30 is 3% to 95% of a width of the tread 11. The sound absorbing material 30 includes an air chamber 31 defined therein, and the sound absorbing material 30 includes an air chamber 31 passing through multiple through orifices 36, wherein a contacting face 32 of the sound absorbing material 30 is adhered on an inner surface 13 so as to reinforce the sound absorbing material 30.

Figure 7:
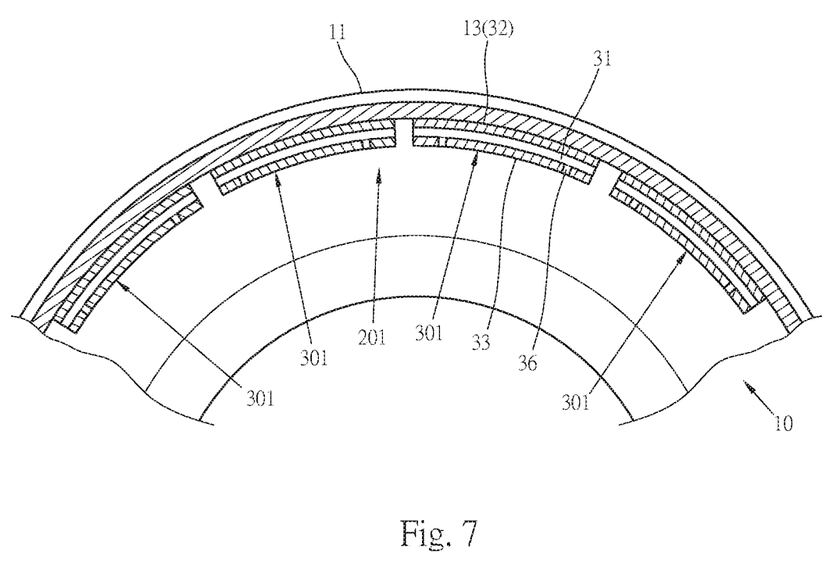
FIG. 7 is a cross sectional view showing the assembly of a part of a tire noise reduction device according to a fourth embodiment of the present invention.

As illustrated in FIG. 7, in a fourth embodiment, a noise reduction structure 201 comprises multiple sound absorbing materials 301 including multiple contacting faces 32 respectively and separately adhered on a portion of the inner surface 13 corresponding to the tread 11 by using adhesive material, wherein a spaced angle between any two adjacent sound absorbing materials 301 is 10 degrees to 30 degrees so as to reduce a weight and a cost of the noise reduction structure 201.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A tire noise reduction device being applicable for a tire, and the tire including a tread formed on an outer wall of the tire and radially spaced from an axis of rotation of the tire, an inner surface formed on an internal wall of the tire, and a tire cavity defined inside the inner surface and configured to accommodate a noise reduction structure;

wherein the noise reduction structure comprises at least one sound absorbing material, each of the at least one sound absorbing material includes a contacting face, and an extending face opposite to the contacting face, wherein the contacting face is adhered on a portion of the inner surface corresponding to the tread, each of the at least one sound absorbing material further including an air chamber formed therein having a first length extending radially with respect to the axis of rotation of the tire and a first longitudinal dimension extending circumferentially with respect to the tire, and each sound absorbing material further includes a channel having a second length extending radially with respect to the axis of rotation of the tire and a second longitudinal dimension extending circumferentially with respect to the tire, the second longitudinal dimension being equal to the first longitudinal dimension and the second length being at least as 40% as long as the first length, the channel passing through the extending face and being in open communication with the air chamber, and facing a central direction of the tire, wherein the sound absorbing material occupies 21% to 90% of a volume of the tire cavity, and wherein noise emission from the tire enters the air chamber through the channel for absorption by the sound absorbing material.

2. The tire noise reduction device as claimed in claim 1 further comprising multiple sound absorbing materials respectively and separately adhered on the portion of the inner surface corresponding to the tread.

3. The tire noise reduction device as claimed in claim 2, wherein a spaced angle between any two adjacent sound absorbing materials is 10 degrees to 30 degrees.

4. The tire noise reduction device as claimed in claim 1, wherein a thickness of the sound absorbing material is 4 mm to 230 mm, and a width of the sound absorbing material is 3% to 95% of a width of the tread.

5. The tire noise reduction device as claimed in claim 1, wherein the air chamber of the sound absorbing material is configured to accommodate solid material.

6. The tire noise reduction device as claimed in claim 1, wherein the air chamber of the sound absorbing material is configured to accommodate inert gas.

7. The tire noise reduction device as claimed in claim 1, wherein the air chamber of the sound absorbing material is configured to accommodate semi-viscous liquid.

8. The tire noise reduction device as claimed in claim 1, wherein the contacting face is adhered on the portion of the inner surface corresponding to the tread by using adhesive material, and the adhesive material is adhesive or double-sided tape.

9. The tire noise reduction device as claimed in claim 1, wherein the channel has a width within 5% to 10% of a width of the air chamber.

* * * * *